J. H. MILLER.
HORSESHOE.
APPLICATION FILED MAR. 15, 1915.
1,191,811.
Patented July 18, 1916.
2 SHEETS—SHEET 2.
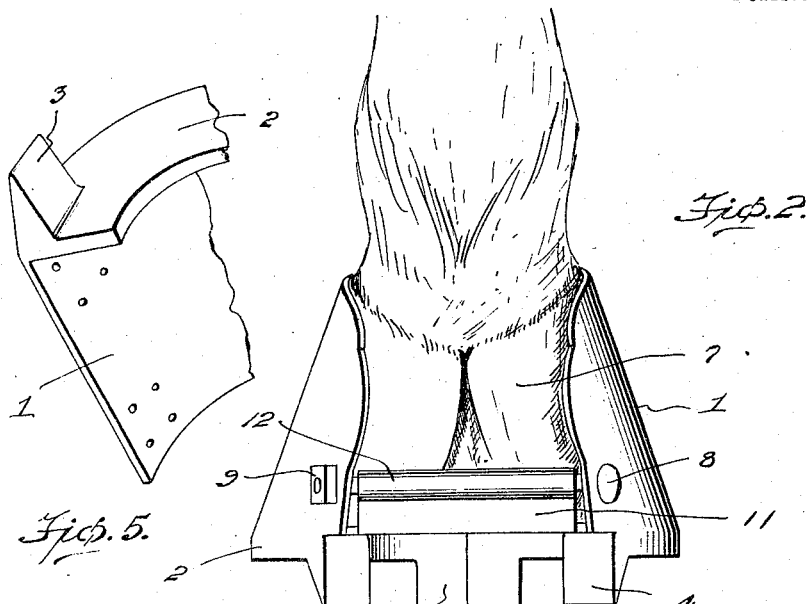
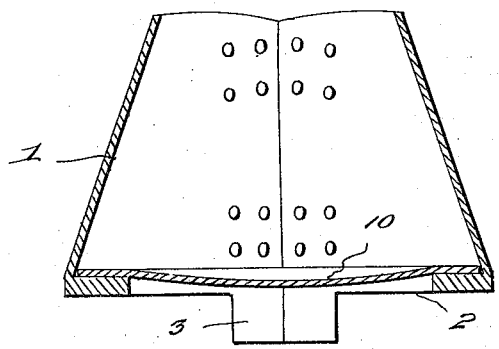
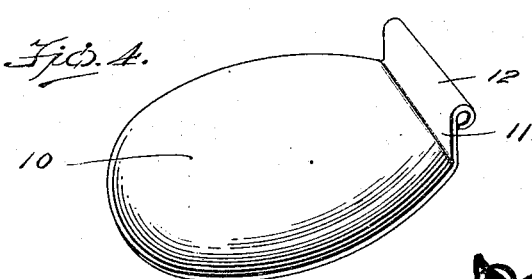
Inventor
J. H. Miller.
Witnesses

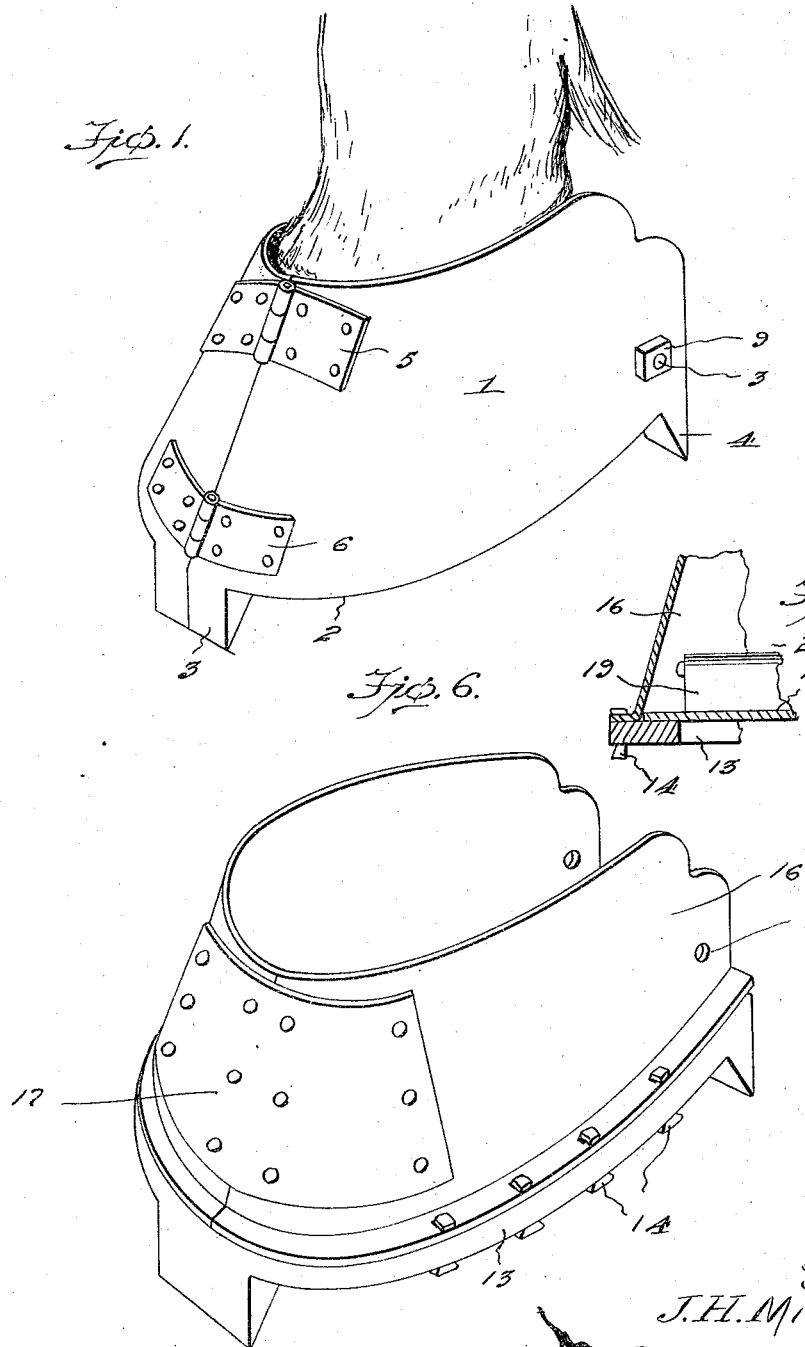

UNITED STATES PATENT OFFICE.

JOHN H. MILLER, OF MEYERSDALE, PENNSYLVANIA.

HORSESHOE.

1,191,811.  Specification of Letters Patent.  Patented July 18, 1916.

Application filed March 15, 1915. Serial No. 14,452.

*To all whom it may concern:*

Be it known that I, JOHN H. MILLER, a citizen of the United States, residing at Meyersdale, in the county of Somerset and State of Pennsylvania, have invented certain new and useful Improvements in Horseshoes; and I do hereby declare the following to be a full, clear, and exact description of the invention, such as will enable others skilled in the art to which it appertains to make and use the same.

The invention relates to improvements in horse shoes.

The object of the present invention is to improve the construction of horse shoes and to provide a simple, practical and efficient horse shoe of inexpensive construction adapted to be readily applied to a horse's hoof without the use of nails and a hammer by either a man or boy.

A further object of the invention is to provide a horse shoe of this character equipped with means for protecting the bottom of the hoof from rough surfaces, glass, nails and the like.

The invention also has for its object to provide a device of this character adapted to enable an ordinary horse shoe to be utilized when desired without requiring skilled labor or interfering with the protecting means.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawings Figure 1 is a perspective view of a horse shoe constructed in accordance with this invention, Fig. 2 is a rear elevation of the same, Fig. 3 is a transverse sectional view, Fig. 4 is a detail perspective view of the bottom plate or shield, Fig. 5 is a detail view of one of the sections of the horse shoe viewed from the under side, Fig. 6 is a perspective view of a horse shoe illustrating another form of the invention, Fig. 7 is a transverse sectional view of one side thereof.

Like numerals of reference designate corresponding parts in all the figures of the drawings.

In the drawings in which is illustrated the preferred embodiment of the invention, the horse shoe comprises in its construction curved walls or boot sections 1 constructed of suitable metal and formed integral with shoe sections 2 extending inwardly from the lower edges of the walls or boot sections 1. The shoe sections 2 which are designed to be provided with front and rear calks 3 and 4 fit together at their front ends and correspond with a horse shoe and receive and support a horse's hoof. The curved walls or boot sections are connected at their front edges by hinges 5 and 6 arranged at the upper and lower edges of the walls or boot sections and riveted or otherwise secured to the same. The walls or sections embrace and snugly fit a horse's hoof 7 as illustrated in Figs. 1 and 2 of the drawing and they are retained in engagement with the hoof by a transverse bolt 8 passing through transversely alined perforations of the said walls or sections 1 and provided at one end with a head and at the other end with a nut 9.

In order to protect the hoof from rough surfaces, nails, glass and the like the horse shoe is equipped with a bottom plate or shield 10 constructed of thin sheet metal or other suitable material and having curved edges and conforming substantially to the configuration of the hoof. The bottom plate or shield 10 which fits snugly between the sides of the horse shoe and which is interlocked with the same by fitting in the angles formed by the bottom shoe sections and the curved walls or boot sections is provided at the back with an upwardly extending flange 11 preferably rolled to form a sleeve 12 for the reception of the bolt 8. The bolt 8 passes through the sleeve which also serves as a spacing sleeve for the rear portions of the sides of the horse shoe. By this construction the transverse bolt 8 secures both the horse shoe and the bottom plate or shield to the hoof and the device may be readily applied to the same by man or boy without experienced labor.

The device is also adapted to eliminate nails and a hammer for securing the horse shoe to a hoof which is thereby maintained in much better condition than is possible where shoes are used employing the ordinary nails.

In Figs. 6 and 7 of the drawings is illustrated another form of the invention which is designed for enabling an ordinary solid continuous horse shoe 13 to be employed and to be secured to a horse's hoof without nailing through the same. The horse shoe 13 is secured by nails 14 which pass through outwardly extending flanges 15 of wall or boot sections 16 and also through the holes in the horse shoe 13. The curved walls or boot sections 16 which conform to the configuration of the hoof similar to the sections 1 are hinged at the front by means of a spring plate 17 or other suitable means. The spring plate which is resilient is riveted or otherwise secured to the outer faces of the front portions of the sections 16 and it permits the same to be spread and contracted as required. The shoe 13 projects inwardly from the sections 16 and is adapted to support the hoof which is protected by a bottom plate or shield 18 constructed similar to that heretofore described and provided at the back with an upwardly extending flange 19 having a sleeve 20 through which passes a bolt 21 for securing the shoe to the hoof of a horse. The bolt is adapted to draw the sides 16 tightly against the hoof so that the horse shoe will be securely retained thereon.

What is claimed is:—

A horse shoe of the class described comprising curved boot sections, hinges connected to opposite sides of said sections in the front face thereof adapted to allow the boot sections to move outwardly and inwardly, said sections arranged to conform to the configuration of a horse's hoof, a bottom plate or shield arranged to extend in and rest upon the foot sections of the boot, said plates provided with a rearwardly extending flange, said flange bent back upon itself to form a sleeve, and bolt arranged to extend transversely through the boot section and the sleeve of the plate for holding the bottom plate and boot sections securely together substantially as described.

In testimony whereof I affix my signature in presence of two witnesses.

JOHN H. MILLER.

Witnesses:
WM. B. COOK,
ROBERT COOK.

Copies of this patent may be obtained for five cents each, by addressing the "Commissioner of Patents, Washington, D. C."